United States Patent
Duffield et al.

(10) Patent No.: US 9,860,181 B2
(45) Date of Patent: *Jan. 2, 2018

(54) SYSTEM AND METHOD FOR INFERRING TRAFFIC LEGITIMACY THROUGH SELECTIVE IMPAIRMENT

(71) Applicant: AT&T Intellectual Property II, L.P., Atlanta, GA (US)

(72) Inventors: Nicholas Duffield, Summit, NJ (US); Balachander Krishnamurthy, New York, NY (US)

(73) Assignee: AT&T INTELLECTUAL PROPERTY II, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/224,567

(22) Filed: Jul. 31, 2016

(65) Prior Publication Data
US 2016/0344639 A1    Nov. 24, 2016

Related U.S. Application Data

(63) Continuation of application No. 14/822,578, filed on Aug. 10, 2015, now Pat. No. 9,407,527, which is a
(Continued)

(51) Int. Cl.
*G06F 17/00* (2006.01)
*G06N 5/02* (2006.01)
(Continued)

(52) U.S. Cl.
CPC ....... *H04L 47/2475* (2013.01); *G06Q 10/063* (2013.01); *H04L 43/10* (2013.01); *H04L 43/50* (2013.01); *H04L 67/025* (2013.01)

(58) Field of Classification Search
CPC .................. G06F 11/21; G06N 5/02
(Continued)

(56) References Cited

U.S. PATENT DOCUMENTS

| 6,115,395 A | 9/2000 | Norrell et al. |
| 6,324,492 B1 * | 11/2001 | Rowe .................. H04L 12/2697 370/241 |

(Continued)

OTHER PUBLICATIONS

On-Line Inference Comparison with Markov Logic Network Engines for Activity Recognition in AAL Environments Manuel Fernandez-Carmona; Nicola Bellotto 2016 12th International Conference on Intelligent Environments (IE) Year: 2016 pp. 136-143, DOI: 10.1109/IE.2016.29 IEEE Conference Publications.*

(Continued)

*Primary Examiner* — Michael B Holmes

(57) ABSTRACT

Described is a system and method for determining a classification of an application that includes initiating a stress test on the application, the stress test including a predetermined number of stress events, wherein the stress events are based on a network impairment. A response by the application to each stress event is identified and the application is classified as a function of the response into one of a first classification and a second classification, the first classification indicative of a normal application and the second classification indicative of an undesired application. If, the application is in the second classification, a network response procedure is executed.

20 Claims, 2 Drawing Sheets

Related U.S. Application Data continuation of application No. 14/299,730, filed on Jun. 9, 2014, now Pat. No. 9,106,550, which is a continuation of application No. 12/632,716, filed on Dec. 7, 2009, now Pat. No. 8,751,431, which is a continuation of application No. 11/229,156, filed on Sep. 16, 2005, now Pat. No. 7,630,949.

(60) Provisional application No. 60/692,504, filed on Jun. 21, 2005.

(51) Int. Cl.
 *H04L 12/859* (2013.01)
 *G06Q 10/06* (2012.01)
 *H04L 12/26* (2006.01)
 *H04L 29/08* (2006.01)

(58) Field of Classification Search
 USPC .......................................................... 706/48
 See application file for complete search history.

(56) References Cited

U.S. PATENT DOCUMENTS

| | | | |
|---|---|---|---|
| 6,597,660 B1 | 7/2003 | Rueda et al. | |
| 6,816,903 B1 | 11/2004 | Rakoshitz et al. | |
| 7,630,949 B1* | 12/2009 | Duffield | G06Q 10/063 705/7.11 |
| 8,701,185 B2* | 4/2014 | Krishnamurthy | G06F 17/30864 707/705 |
| 8,751,431 B2* | 6/2014 | Duffield | G06Q 10/063 370/400 |
| 9,106,550 B2* | 8/2015 | Duffield | G06Q 10/063 |
| 9,407,527 B2* | 8/2016 | Duffield | G06Q 10/063 |
| 2005/0201409 A1 | 9/2005 | Griswold et al. | |
| 2005/0278205 A1 | 12/2005 | Kato | |
| 2006/0112174 A1 | 5/2006 | L'Heureux et al. | |
| 2006/0147023 A1* | 7/2006 | Croak | H04M 3/10 379/221.11 |
| 2006/0271545 A1 | 11/2006 | Youn et al. | |
| 2010/0088549 A1* | 4/2010 | Duffield | G06Q 10/063 714/38.1 |
| 2010/0095375 A1* | 4/2010 | Krishnamurthy | G06F 17/30864 726/22 |
| 2014/0297850 A1* | 10/2014 | Duffield | G06Q 10/063 709/224 |
| 2015/0350052 A1* | 12/2015 | Duffield | G06Q 10/063 709/224 |
| 2016/0344639 A1* | 11/2016 | Duffield | G06Q 10/063 |

OTHER PUBLICATIONS

Virtual Caregiver: An Ambient-Aware Elderly Monitoring System M. Anwar Hossain; Dewan Tanvir Ahmed IEEE Transactions on Information Technology in Biomedicine Year: 2012, vol. 16, Issue: 6 pp. 1024-1031, DOI: 10.1109/TITB.2012.2203313 IEEE Journals & Magazines.*

Wireless Model-Based Predictive Networked Control System Over Cooperative Wireless Network Alphan Ulusoy; Ozgur Gurbuz; Ahmet Onat IEEE Transactions on Industrial Informatics Year: 2011, vol. 7, Issue: 1 pp. 41-51, DOI: 10.1109/TII.2010.2089059 IEEE Journals & Magazines.*

Activity prediction for in-home activity monitoring G. Virone; A. Sixsmith 2008 IET 4th International Conference on Intelligent Environments Year: 2008 pp. 1-4, DOI: 10.1049/cp:20081099 IET Conference Publications.*

* cited by examiner

SYSTEM AND METHOD FOR INFERRING TRAFFIC LEGITIMACY THROUGH SELECTIVE IMPAIRMENT

PRIORITY CLAIM/INCORPORATION BY REFERENCE

This application is a continuation of U.S. patent application Ser. No. 14/822,578, filed Aug. 10, 2015, now U.S. Pat. No. 9,407,527, which is a continuation of U.S. patent application Ser. No. 14/299,730, filed Jun. 9, 2014, now U.S. Pat. No. 9,106,550, which is a continuation of U.S. patent application Ser. No. 12/632,716, filed Dec. 7, 2009, now U.S. Pat. No. 8,751,431, which is a continuation of U.S. patent application Ser. No. 11/229,156, filed Sep. 16, 2005, now U.S. Pat. No. 7,630,949, and claims priority to U.S. Provisional Patent Application No. 60/692,504, entitled "Stress Testing Traffic to Infer its Legitimacy" filed Jun. 21, 2005. The entirety of each of the above cited applications is incorporated herein by reference.

BACKGROUND

A number of approaches for passively characterizing connections between network entities have been proposed. One conventional approach compares one or more measured characteristics of the connection with corresponding theoretical baselines. A deviation from the baseline is used as a trigger for a router to impose a limit such as, for example, a restriction on a bandwidth available to the connection in order to restore a fair distribution of bandwidth to one or more further connections. The network entity initiates a response to the limit, and based on the response, the connection may be classified as "good" or "bad." However, according to the conventional approach, a classification, and any adjustment made as a function thereof, is executed subsequent to imposition of the limit. Thus, a bad entity will have already had an impact on the further connections prior to the limit being imposed.

SUMMARY OF THE INVENTION

A method for determining a classification of an application including initiating a stress test on the application, the stress test including a predetermined number of stress events, wherein the stress events are based on a network impairment, identifying a response by the application to each stress event, classifying the application as a function of the response into one of a first classification and a second classification, the first classification indicative of a normal application and the second classification indicative of an undesired application and, when the application is in the second classification, executing a network response procedure.

A system having a data-sharing network and a first computing terminal coupled to the network, the first computing terminal executing an application. The system further includes a second computing terminal coupled to the network, the second computing terminal initiating a stress test on the application, the stress test including a predetermined number of stress events, wherein the stress events are based on a network impairment, the second computing terminal identifying a response by the application to each stress event, the second computing terminal classifying the application as a function of the response into one of a first classification and a second classification, the first classification indicative of a normal application and the second classification indicative of an undesired application, wherein, when the application is in the second classification, the second computing terminal executes a network response procedure.

A device including a processor and a memory storing a set of instructions executable by the processor. The set of instructions being operable to initiate a stress test on an application, the stress test including a predetermined number of stress events, wherein the stress events are based on a network impairment, identify a response by the application to each stress event, classify the application as a function of the response into one of a first classification and a second classification, the first classification indicative of a normal application and the second classification indicative of an unauthorized application and, when the application is in the second classification, execute a network response procedure.

DETAILED DESCRIPTION

Figure 1:
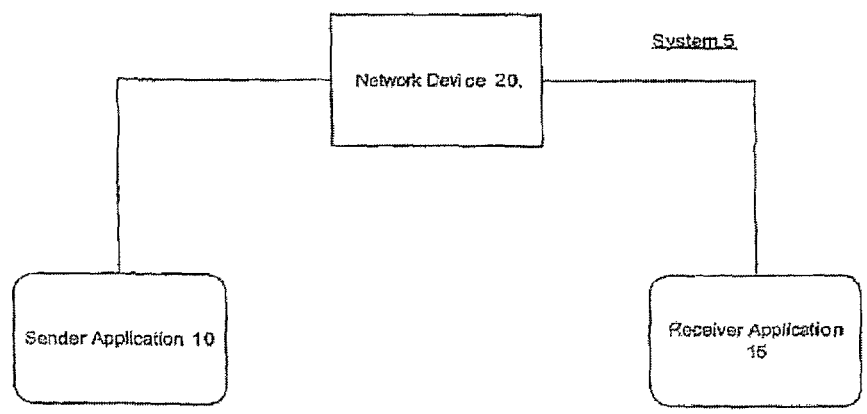
FIG. 1 shows an exemplary embodiment of a system according to the present invention.

The present invention may be further understood with reference to the following description and the appended drawings, wherein like elements are referred to with the same reference numerals. The exemplary embodiment of the present invention describes a system and a method for classification of network traffic to classify a network entity in advance of an impact thereof on a network. A classification of the entity determined as a function of a response generated as a result of a stress test performed thereon, as will be described below.

FIG. 1 shows a system 5 according to the present invention which represents a connection between a first network entity (e.g., a sender application 10) and a second network entity (e.g., a receiver application 15) over a data-sharing network. The connection between the applications 10, 15 may be sustained by a network device 20 (e.g., a router). Further, the applications 10, 15 may utilize a same protocol to transmit data packets to each other via the connection, which will be described further below. Those of skill in the art will understand that each of the applications 10, 15 may be executed on a corresponding computing terminal which communicates with the device 20 via a wired connection (e.g., an Ethernet cable). As further understood by those of skill in the art, any number of intermediate computing terminals and/or network devices may be positioned between the computing terminals executing the applications 10, 15. That is, in one embodiment, each of the applications 10, 15 may be executing on a fringe computer terminal (e.g., an ingress point to the network). Thus, the intermediate computing terminals and network devices may be generally included in a middle of the network.

According to the present invention, a network performance of the sender application 10 may be measured by inducing a stress test on the protocol utilized thereby. The stress test may include a sequence of one or more stress events. For each stress test performed, the sequence may be modified by changing an event frequency within the sequence, an event duration of a single event, a sequence duration (e.g., a sum of all the event durations) and/or an event granularity (e.g., targeting a specific IP address, subnet or port). As understood by those of skill in the art, it is preferable that the sequence utilized by each stress test is sufficiently unique such that it may not be identified and subsequently recognized by the sender application 10. That is, in one embodiment, the stress events included in the sequence may be determined randomly or pseudo-randomly (e.g., based on a type of the sender application 10). A response to the stress test identifies a classification of the sender application 10 as, for example, a "good" application or a "bad" application (e.g., undesired application). The response of the good application will fall within a predetermined range of responses, whereas, the response of the bad application will fall outside the range. The classification may be utilized to determine whether the sender application 10 requires further analysis and/or should have the connection blocked/terminated because it is affecting the network performance of further applications.

The stress test may be modeled after an impairment experienced by the sender application 10 during normal operation of the network based on an assumption that the good application may recover from the impairment and resume normal operation (e.g., generate a proper reaction). In one embodiment, the impairment corresponds to a conventional ambient impairment which is experienced by the sender application 10 in the absence of the stress test. That is, the ambient impairment may include packet loss, delay, network rerouting and/or resource contention at an endpoint which occurs during normal operation. The ambient impairment may be measured by an application level statistic(s) and/or a network measurement(s) collected during execution of the sender application 10 in the absence of the stress test. The statistics and measurements may be collected by, for example, a simple network management protocol (e.g., at a connection level), a Trajectory Sampling (e.g., estimates a loss rate at individual connections and terminals), etc. In another embodiment, the impairment may be determined using a traffic monitor (e.g., a honeypot). As known in the art, the honeypot may be a trap which detects an unauthorized use of the terminal, data and/or an IP space.

Throughout this description the term impairment will be used to indicate any type of abnormal operation which may be injected into the system to determine the system's response to the abnormal operation in conformance with the exemplary embodiments of the present invention. In the examples provided above, the described impairments were packet impairments, e.g., TCP packet impairments. However, impairments are not limited to packets, but may be injected at any networking or protocol level/layer. In another example, the impairment may be injected at the application layer. For example, an impairment may be included as part of an HTTP message. Thus, the impairments that may be used in conjunction with the present invention are not limited to any specific type of impairments. Those of skill in the art will understand that there are numerous types of impairments that may be used.

Furthermore, the impairment may be injected at any location in the network. For example, referring to the system 5 in FIG. 1, the desired impairment may be injected at network device 20 during the communication between sender application 10 and receiver application 20, each of which are assumed to be on separate end point computing devices. The injection of this impairment will be made by a software program resident on the network device 20 operating in accordance with the principles of the present invention. Those of skill in the art will understand that the present invention may be implemented as software code operating on one or more of the computing devices that make up the network on which the present invention may be deployed.

The functionality described for the exemplary embodiments of the present invention may be included as part of a stand-alone software application or be included in one or more software applications which are used to accomplish the tasks associated with the present invention and other tasks.

However, the desired impairment may also be injected at other locations in the system 5. For example, either of the end point computing devices that host applications 10 and 15 may include the functionality to inject the impairment into the system 5. In addition, those of skill in the art will understand that a communications network normally includes a plurality of computing devices that are attached or connected to the communications network, whether the network operates in a distributed mode or in peer-to-peer communications. Thus, the impairment injection functionality (along with the other functionality described herein for the exemplary embodiments of the present invention) may be included in any of these other computing devices which are connected to the communication network. For example, if the present invention is implemented on a particular communication network, the network provider may include a stand alone network appliance which includes the functionality described herein.

When the stress test is introduced, the sender application 10 may execute a response to each event in the sequence. In one category, the response may be a termination of activity. That is, the sender application 10 may have terminated the connection with the receiver application 15 and initiated a further connection with a further receiver application. The termination may also indicate that the sender application 10 has experienced an unrecoverable error as result of the stress test and cannot continue execution. Regardless of the reason for the termination, the stress test may be discontinued allowing for further analysis of the sender application 10 during normal operation. In another category, the response may be a corrective action indicative of what would be done by the good application. Thus, the stress test may be discontinued. In a further category, the response may be a suspicious action which may require analysis of further responses and/or initiation of a network response procedure by the device 20 and/or a network administrator. Continuation of the stress test may be based on the network response procedure which is utilized. As understood by those of skill in the art, the termination may be included as either the corrective action or the suspicious action depending on, for example, a type of the sender application 10. Thus, in one embodiment, only the corrective action and the suspicious action may be the categories of the responses.

The response(s) may be utilized to determine a classification for the sender application 10 (e.g., whether it is the good application or the bad application). In one embodiment, the classification may be determined by whether a number of the suspicious actions and/or terminations exceeds a predetermined threshold. For example, as the events from the stress test are introduced, the responses are stored in a response history (e.g., a queue). The number of suspicious procedures and/or terminations generated by the sender application 10 is continually compared to the predetermined threshold. If the number ever exceeds the threshold, the sender application 10 is determined to be the bad application, the stress test may be terminated and the network response procedure may be initiated. In one embodiment, the response history may be deleted, so that a new, empty response history is generated for each stress test. In another embodiment, the response history may utilize a drain rate at which the responses are removed therefrom. For example, the response history may be an infinite buffer which stores the responses. The classification may then be based on a threshold ratio of the suspicious actions and/or terminations to a predetermined number of responses. Thus, the stress test may continue indefinitely.

In another embodiment, the responses generated by the sender application 10 may be compared to stored responses in a database. The stored responses may be indicative of a reaction by the bad and/or good applications. For example, the response is compared to a list of stored responses to determine whether the classification of the sender application 10. As understood by those of skill in the art, the stored responses may only be those which would likely be generated by the bad application. Thus, if a number of matches between the response(s) and the stored responses exceeds the predetermined threshold, the sender application 10 may be classified as the bad application. The database may further include data regarding further sender applications which are bad applications and/or suspected of being bad applications. In this manner, further network devices may share information about the bad applications on the network.

Those of skill in the art will understand that as a number of responses generated increases, a likelihood for identifying false conditions decreases (e.g., false positive—good application identified as bad, false negative—bad application identified as good). Thus, in one embodiment, the stress test may be conducted in view of a misidentification parameter M, which may be generated by, for example, testing the stress test and/or empirical feedback therefrom. So, if a proportion p of the total traffic on the connection is thought to be bad traffic, then the misidentification parameter M may be chosen according to the following equation:

$$C(M)=pf_-(M)+(1-p)f_+(M)$$

where

C=a total cost of identifying false conditions when conducting the stress test $f_-$=rate of identifying false negatives $f_+$=rate of identifying false positives Thus, the stress test may be constructed to minimize a number and/or rate of misidentifications.

As described above, the classification of the sender application 10 may determine whether the network response procedure is executed. For example, if the sender application 10 is the bad application, the network response procedure may include terminating the network connection thereof. Additionally, an identifier of the sender application 10 and/or the terminal executing it may be obtained and used to block further attempts to connect to the network. In another embodiment, the network response procedure may include a deprioritization of the sender application 10 such that, for example, the bandwidth allocated thereto may be decreased. In a further embodiment, the network response procedure may include a network reconfiguration redirecting transmissions from the sender application 10 to a network-controlled receiver for monitoring and analysis. If the sender application 10 is the good application, the network device 20 may analyze a further sender application and/or wait for a predefined interval to re-analyze the sender application 10.

Figure 2:
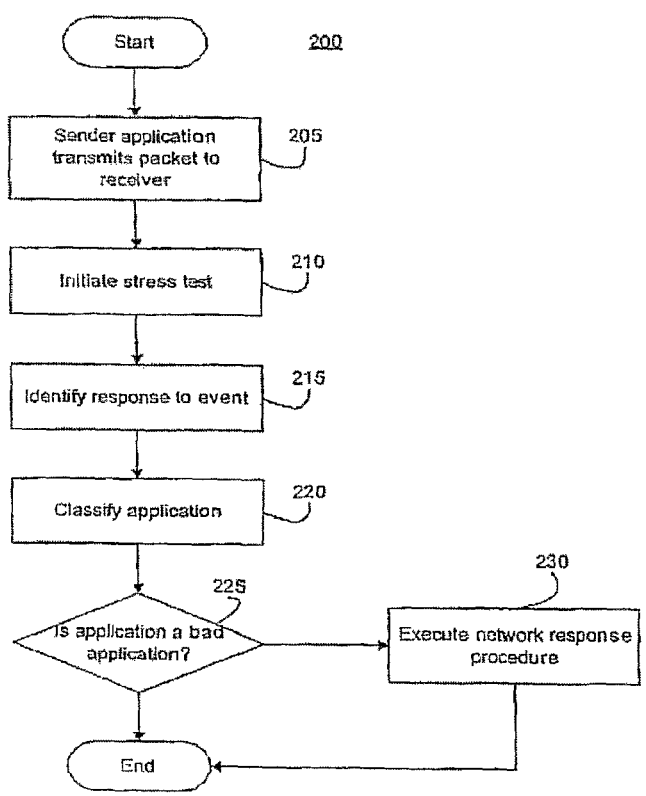
FIG. 2 shows an exemplary embodiment of a method according to the present invention.

FIG. 2 shows an exemplary method 200 for conducting the stress test and analyzing results thereof according to the present invention. Although, the method 200 will be described as conducted at the sender application 10, those of skill in the art will understand that the method 200 may be conducted at any point within the network, such as, for example, at the receiver application 15 or in the middle of the network. As described above, the sender application 10 utilizes a predetermined protocol when transmitting data to the receiver application 15. Although, the method 200 will be described as the predetermined protocol being a transmission control protocol ("TCP"), those of skill in the art will understand that the protocol may be any other congestion avoidance transport protocol (e.g., stream control transmission protocol, datagram congestion control protocol), as well as a user datagram protocol ("UDP"), a simple mail transfer protocol ("SMTP"), a hypertext transfer protocol ("HTTP") or a peer-to-peer protocol ("P2P"). Furthermore, the method 200 may be applied to any networking level.

In step 205, the sender application 10 is transmitting packets to the receiver application 15. Thus, in one embodiment, the method 200 may be performed continuously for an established network connection. That is, the classification of the sender application 10 may be determined in an ongoing basis. As understood by those of skill in the art, the connection may have been initiated in a conventional manner according to the TCP. That is, the sender application 10 transmits a SYN packet to the receiver application 15 to synchronize the connection therebetween, in the event that it is established. The receiver application 15 transmits a SYN/ACK packet to the sender application 10 to complete the connection, and thereafter, the packet transfer may occur. In this embodiment, the sender application 10 begins transmitting one or more packets to the receiver application 15. In the TCP, the receiver application 15 confirms receipt of a non-SYN packet by transmitting an ACK packet to the sender application 10.

In step 210, the stress test is initiated on the sender application 10. As described above, the stress test may be modeled after the ambient impairment which would typically be encountered by the sender application 10 during the normal network operation. For example, in one embodiment, the ACK packet may be intercepted to simulate congestion (e.g., packet loss/delay) at the receiver application 15. Each interception of the ACK packet may be the event in the stress test. Thus, the sequence of events may include the interception of a plurality of the ACK packets. Those of skill in the art will understand that the events in the sequence may be immediately successive or have a predefined interval therebetween. The predetermined interval may be adjusted to simulate different levels of congestion. Further, it is preferable that the SYN/ACK packet is not intercepted as one of the events in the stress test, because preventing the connection between the applications 10,15 may significantly affect the network performance thereof (e.g., the sender application 10 may continually re-transmit the SYN packet, causing congestion). However, those of skill in the art will understand that preventing the connection may be useful for detecting whether the sender application 10 is a virus and/or a portscan, or is initiating a SYN flood (e.g., transmitting numerous SYN packets and ignoring the SYN/ACK packets forcing a server to keep track of a large number of half-open connections). For each event in the stress test, the corresponding response is generated by the sender application 10.

In step 215, the response by the sender application 10 to event is identified. As described above, the response may be generally categorized as the termination, the corrective action or the suspicious action. For example, when the ACK packets are intercepted, the expected corrective action by the sender application 10 may include throttling packet transmission, whereas, the suspicious action may include the termination (e.g., looking for a further receiver application to exploit) and/or increasing packet transmissions (e.g., an aggressive behavior). A predetermined number of responses may be identified before proceeding with the method 200.

That is, a relationship between the predetermined number of responses identified and a likelihood of mis-classifying the sender application is inversely proportional. For example, if a single response is identified as the suspicious action, and the sender application 10 is classified solely based on that response, the likelihood that sender application 10 will be mis-identified as the bad application is higher, than if the predetermined number of responses was increased. Thus, the equation described above utilizing the misidentification parameter M may be used to determine the predetermined number. Also, in this step 215, each response may be stored in the response history for classifying the sender application 10.

In step 220, the sender application 10 is classified as a function of the response(s). For example, the stress test may compare an expected response to the response generated by the sender application 10. That is, the expected response may correspond to a response to the event which would be generated by the good application (e.g., the corrective action). If the response is the same as or substantially similar to the expected response, the sender application 10 may be identified as the good application. That is, the response may not be exactly the same as the expected response, but tends to correspond to the good application or has no effect on the classification. This may decrease the chance of mis-identifying the sender application 10. If the response differs from the expected response, the sender application 10 may be identified as the bad application. After the sender application 10 has been classified, the stress test may be terminated and/or the response history deleted/drained. In yet another embodiment, the network response procedure may include sharing a result of the stress test (e.g., the classification of the sender application 10) with further networking devices, which may confirm the result and/or make network decisions as a function thereof. That is, identification of the bad applications within the network may lead to increased network performance.

In step 225, it is determined whether the sender application 10 is the bad application. If the sender application 10 is the bad application, the method 200 proceeds to step 230 whereby the network response procedure is initiated. As described above, the network response procedure may include a message to the receiver application 15 and/or an administrator device (e.g., a server) indicating that the sender application 10 requires further analysis (e.g., more comprehensive testing/evaluation). In another embodiment, the network response procedure may include terminating the connection of the sender application 10 to the network. In a further embodiment, the network response procedure may include the block and/or the deprioritization of the sender application 10. In this embodiment, the sender application 10 may be prevented from transmitting further packets over the connection and/or wait for a predefined interval in which to transmit.

If the sender application 10 is not the bad application, it may be inferred that sender application 10 is the good application or some benign application which is not adding to congestion of the network or in any manner degrading the network performance. In the latter case, the network administrator may flag the sender application 10 and perform a further stress test thereon at a subsequent time.

Although the method 200 has been described with respect to initiating the stress test on an endpoint of the network, those of skill in the art will understand that the middle of network may be stress tested, as well. For example, since a larger number of connections may be monitored in the middle of the network, a compression scheme may be used to compile the responses and the corresponding classifications. In one embodiment, the compression scheme may be a Bloom Filter which reduces a space needed to execute the stress tests on the large number of connections. In this embodiment, the Bloom filter may extract the responses which correspond to the suspicious actions and store keys for connection thereto. The classification may be yielded by a highest level Bloom filter which declares a match on the key.

In another embodiment of the present invention, the sender application 10 may utilize the UDP as the protocol. As understood by those of skill in the art, the UDP does not include any congestion adaption mechanism. Thus, the sender application 10 may implement a unique congestion adaption mechanism by, in the face of congestion, reducing a packet transmission rate and/or increasing packet repetition (e.g., for reliability). A port number may be used to identify the sender application 10 to determine and/or record the expected response to the ambient impairment. For example, the unique congestion adaption mechanism may be a realtime transport protocol ("RTP") running over the UDP. Within the RTP, an RTP control protocol ("RTPCP") provides feedback on a quality of data distribution by the sender application 10. The stress test may reduce the quality of the data received by the receiver application 15, which may, in turn, notify the sender application 10 of the reduced quality via the RTPCP. If the sender application 10 is the good application, it may generate the expected response (e.g., reduce a number of layers transmitted from a layered encoding of audio or video data). Otherwise, the sender application 10 may be the bad application and the network response procedure may be initiated.

In the above embodiment, the port number (e.g., port number 53) may include a DNS traffic of UDP exchanges between a DNS client, a plurality of local DNS servers and an authoritative DNS server. The DNS client transmits a query (e.g., for translation of a domain name into an IP address) to the plurality of local DNS servers in parallel. Each local DNS server looks to fulfill the query at the authoritative DNS server. The stress test may be implemented at the authoritative DNS server which may direct the query to a non-existent server. Based on whether a re-transmission of the query is attempted and a number of re-transmissions attempted, the classification of the DNS client may be determined.

In another exemplary embodiment, the sender application 10 may utilize the SMTP to transmit an email to the receiver application 15. In this embodiment, the stress test may determine whether the sender application 10 is a spammer (e.g., a robot which transmits unsolicited emails). The SMTP utilizes a retry mechanism which attempts to deliver the email over a predetermined number of days. After the retry mechanism fails, the sender application 10 is notified of the failure. Typically, the spammer will not attempt to resend the email, because it cannot parse a reply message (e.g., from the retry-mechanism or a mailer-daemon). If the stress test indicates that the email was undeliverable, the expected response may include an attempt to resend the email. Thus, each attempt decreases a probability that the sender application 10 is the spammer.

In a further embodiment, at an HTTP layer, the stress test may include redirecting a website request and generating a retry response (e.g., a 307 Temporary Redirect, a 408 Request Timeout, a 503 Service Unavailable). Similar to the spammer above, it is assumed that an attack program (e.g., a hack) will not retransmit the request. That is, the attack program will likely turn to a further receiver application 15

(e.g., a further website). Thus, a web server may monitor a frequency of the requests and re-transmissions thereof to determine the classification of the sender application 10.

The sender and receiver applications 10,15 may utilize the P2P protocol when exchanging data in another exemplary embodiment of the present invention. Those of skill in the art will understand that the P2P protocol may include, but is not limited to Napster®, Gnutella®, Kazaa® and BitTorrent®. In this embodiment, the expected response may be a throttle on the connection between the applications 10,15 initiated in response to when, for example, the receiver application 15 does not dedicate enough of its bandwidth to uploading the packets. That is, simulating a decrease of the bandwidth used by the receiver application 15 may be the stress test to determine whether the classification of the sender application 10. Those of skill in the art will understand that the stress test may be enhanced in the P2P protocol if there is a local history between the applications 10,15 or a global history of the sender application 10 with further applications.

Those of skill in the art will understand that the stress test may not be practical for use on a set of preidentified applications. For example, online gaming and audio/video sessions are highly sensitive to loss and delay, and, as such, may be identified and removed from the applications which are to be analyzed. The preidentified applications may be identified by, for example, the port number. In another embodiment, the stress test may be limited by a service level agreement ("SLA") which guarantees that the packet loss and/or delay will not go beyond a predefined congestion threshold. Thus, in this embodiment, the SLA may define boundaries for the stress test.

It will be apparent to those skilled in the art that various modifications may be made in the present invention, without departing from the spirit or scope of the invention. Thus, it is intended that the present invention cover the modifications and variations of this invention provided they come within the scope of the appended claims and their equivalents.

The invention claimed is:

1. A method for classifying an application, the method comprising:
   initiating, via a processor, a stress event on the application, wherein the stress event is based on a network impairment, wherein the network impairment comprises an ambient impairment, wherein the ambient impairment comprises a resource contention, wherein the resource contention is simulated by intercepting a communication of the application;
   identifying, via the processor, a response by the application to the stress event;
   classifying, via the processor, the application as a function of the response into one of: a first classification and a second classification, the first classification indicative of a normal application and the second classification indicative of an undesired application; and
   when the application is in the second classification, executing, via the processor, a network response procedure, wherein the network response procedure comprises a termination of a connection between the application and a network.

2. The method of claim 1, further comprising:
   executing the application on a computing terminal at an ingress point to the network.

3. The method of claim 1, further comprising:
   executing the application on a computing terminal at a middle point of the network.

4. The method of claim 1, wherein the initiating comprises associating the stress event with a predetermined frequency of occurrence of the stress event.

5. The method of claim 1, wherein the initiating comprises associating the stress event with an event duration.

6. The method of claim 1, wherein the stress event is associated with an event granularity.

7. The method of claim 1, wherein the network response procedure further comprises a block to a further connection to the network by the application.

8. The method of claim 1, wherein the network response procedure further comprises a redirection of transmissions by the application.

9. The method of claim 1, wherein the application utilizes a predetermined protocol.

10. The method of claim 9, wherein the predetermined protocol comprises a transmission control protocol.

11. The method of claim 9, wherein the predetermined protocol comprises a user datagram protocol.

12. The method of claim 9, wherein the predetermined protocol comprises a simple mail transfer protocol.

13. The method of claim 9, wherein the predetermined protocol comprises a hypertext transfer protocol.

14. The method of claim 9, wherein the predetermined protocol comprises a peer-to-peer protocol.

15. The method of claim 1, further comprising:
   storing, by the processor, the one of the first classification or the second classification, of the application in a database.

16. The method of claim 1, further comprising:
   comparing, by the processor, the response to a stored response in a database, the stored response being indicative of the second classification generated by the undesired application.

17. A tangible computer-readable medium storing instructions which, when executed by a processor, cause the processor to perform operations for classifying an application, the operations comprising:
   initiating a stress event on the application, wherein the stress event is based on a network impairment, wherein the network impairment comprises an ambient impairment, wherein the ambient impairment comprises a resource contention, wherein the resource contention is simulated by intercepting a communication of the application;
   identifying a response by the application to the stress event;
   classifying the application as a function of the response into one of: a first classification and a second classification, the first classification indicative of a normal application and the second classification indicative of an undesired application; and
   when the application is in the second classification, executing, via the processor, a network response procedure, wherein the network response procedure comprises a termination of a connection between the application and a network.

18. The tangible computer-readable medium of claim 17, wherein the initiating comprises associating the stress event with a predetermined frequency of occurrence of the stress event.

19. The tangible computer-readable medium of claim 17, wherein the initiating comprises associating the stress event with an event duration.

20. A device, comprising:
a processor; and
a memory storing a set of instructions which, when executed by the processor, cause the processor to perform operations for classifying an application, the operations comprising:
- initiating a stress event, wherein the stress event is based on a network impairment, wherein the network impairment comprises an ambient impairment, wherein the ambient impairment comprises a resource contention, wherein the resource contention is simulated by intercepting a communication of the application;
- identifying a response by the application to the stress event;
- classifying the application as a function of the response into one of a first classification and a second classification, the first classification indicative of a normal application and the second classification indicative of an unauthorized application; and
- when the application is in the second classification, executing a network response procedure, wherein the network response procedure comprises a termination of a connection between the application and a network.

\* \* \* \* \*